United States Patent [19]

Hipwell

[11] 3,876,824

[45] Apr. 8, 1975

[54] DENSITY MEASURING APPARATUS

[75] Inventor: William Ernest Henry Hipwell, Elstree, England

[73] Assignee: Eastman Kodak Company, Rochester, N.Y.

[22] Filed: Jan. 31, 1974

[21] Appl. No.: 438,306

[30] Foreign Application Priority Data

Feb. 1, 1973 United Kingdom ................ 5123/73

[52] U.S. Cl. .................... 178/6; 178/66 R; 356/203; 358/80

[51] Int. Cl. .............................................. H04n 1/02

[58] Field of Search ....... 178/DIG. 28, 6, 6.8, 6.6 R, 178/6.7 R; 356/202, 203; 358/13, 76, 80

[56] References Cited

UNITED STATES PATENTS

| | | | |
|---|---|---|---|
| 3,053,987 | 9/1962 | Cook | 356/203 |
| 3,202,042 | 8/1965 | Jamieson | 356/203 |
| 3,436,473 | 4/1969 | McMann | 178/6 |
| 3,729,584 | 4/1973 | deVos | 178/6.6 R |
| 3,741,664 | 6/1973 | Torin | 356/203 |

*Primary Examiner*—Howard W. Britton
*Assistant Examiner*—Michael A. Masinick
*Attorney, Agent, or Firm*—W. F. Noval

[57] ABSTRACT

A method of determining the average density of a photographic original such as a transparency, including the steps of scanning the original in a raster pattern to produce a voltage varying electrical signal representing the point-to-point density or transmissivity of the original; clamping the voltage varying signal to a gray level; converting the voltage varying signal to a frequency varying signal having a frequency dependent on the variation of the voltage varying signal from the gray level; and counting the number of cycles of the frequency varying signal over a complete raster scan of the original to obtain a density signal representative of the average density or transmissivity of the photographic original. Apparatus is also disclosed for modifying the voltage varying signal in accordance with the density signal and for applying the modified signal to a flying spot cathode ray tube in order to make a reproduction of the photographic original on photosensitive material.

14 Claims, 3 Drawing Figures

DENSITY MEASURING APPARATUS

BACKGROUND OF THE INVENTION

1. FIELD OF THE INVENTION

This invention relates to method and apparatus for determining the average density of an image bearing medium and further relates to electronic photographic reproduction apparatus which uses such determined density for controlling the reproduction of an image bearing medium on photosensitive material by means of a flying spot scanning cathode ray tube.

2. DESCRIPTION OF THE PRIOR ART

In an electronic photographic reproduction system, it is necessary to control printing density and color balance. Since all three colors are normally printed sequentially from a common cathode ray tube, density and color balance can be controlled by applying individual and common corrections to the three sequential color signals.

To allow for convenient calibration and simple manual override of the correction factors it is desirable that the correction be quantized into a small number of discrete steps compatible with the "plus" and "minus" correction buttons provided on known optical printers.

SUMMARY OF THE INVENTION

It is an object of the present invention to provide method and apparatus for determining the average density of an image bearing medium.

It is a further object of the present invention to provide photographic reproduction apparatus including a flying spot cathode ray tube for exposing photosensitive reproduction material wherein the characteristics of the exposing beam are determined by scanning a photographic original to produce an electrical signal representative of the characteristics of the photographic original, by modifying the electrical signal in accordance with the average characteristics of the original as derived from said signal and by controlling the cathode ray tube as a function of the modified signal.

In general, the present invention comprises method and apparatus for determining the average density of an image bearing medium through scanning the image bearing medium in a raster scan to produce a signal level varying electrical signal; clamping the signal level varying electrical signal to a predetermined signal level; converting this signal to a frequency varying signal having a frequency dependent upon the deviation of said varying signal level from said predetermined level; and counting the number of cycles of the frequency varying signal over a complete raster scan of the medium to obtain a density signal representative of the average density of the medium. According to another aspect of the invention the signal level varying electrical signal is modified by the density signal and said modified signal is applied to a flying spot cathode ray tube to make a reproduction of the image bearing medium on photosensitive material.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

DESCRIPTION OF THE PREFERRED EMBODIMENTS

Because photographic apparatus are well known, the present description will be directed in particular to elements forming part of, or cooperating more directly with, the present invention, apparatus not specifically shown or described herein being understood to be selectable from those known in the art.

Figure 1:
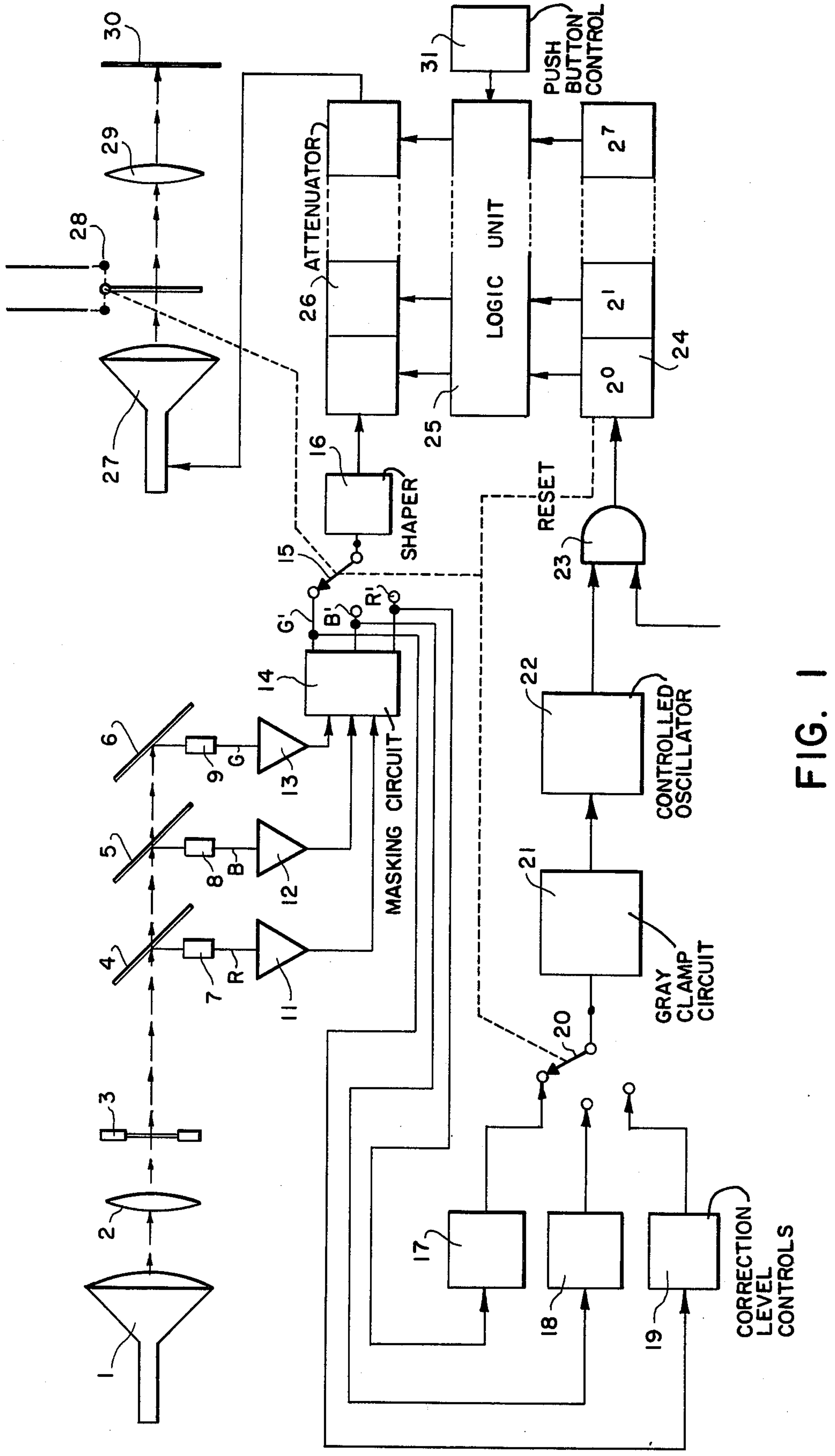
FIG. 1 shows a block diagram of the density measuring and photographic reproduction apparatus according to a preferred embodiment of the present invention.

Referring to FIG. 1, a raster is produced on a cathode ray tube 1, by a scanning circuit (not shown) and is focused onto a transparency 3 by a lens 2.

The resultant image is filtered by dichroic mirrors 4, 5 and 6 to produce red, blue and green images on photomultipliers 7, 8 and 9 respectively.

The signals R, B and G from the photo-multipliers 7, 8 and 9 are fed to respective log-amplifiers 11, 12 and 13 and masking occurs in a masking circuit 14, comprising a resistive matrix and correction amplifier, giving corrected output signals R′, B′ and G′. Signals R′, B′ and G′ are then each split into two separate channels, the control signal channel is fed initially to preset correction level controls 17, 18 and 19 for R′, G′ and B′ signals respectively. The signals for both the control signal channel and the controlled channel are fed to synchronous sequencing switches 20 and 15 respectively, to provide sequential signals representing the red, green and blue transparency frame images synchronized in the two channels.

The controlled signal channel is fed by way of a shaper 16 and a switched step attenuator 26, having binary relationships between the attenuator steps, and then is arranged to give brightness modulation of the display cathode ray tube 27.

Movable filters 28 are arranged to be interposed in the optical path synchronously with the sequencing switches 15 and 20 to produce sequential color corrected images, which are focussed by lens 29 onto printing paper 30.

Figure 2:
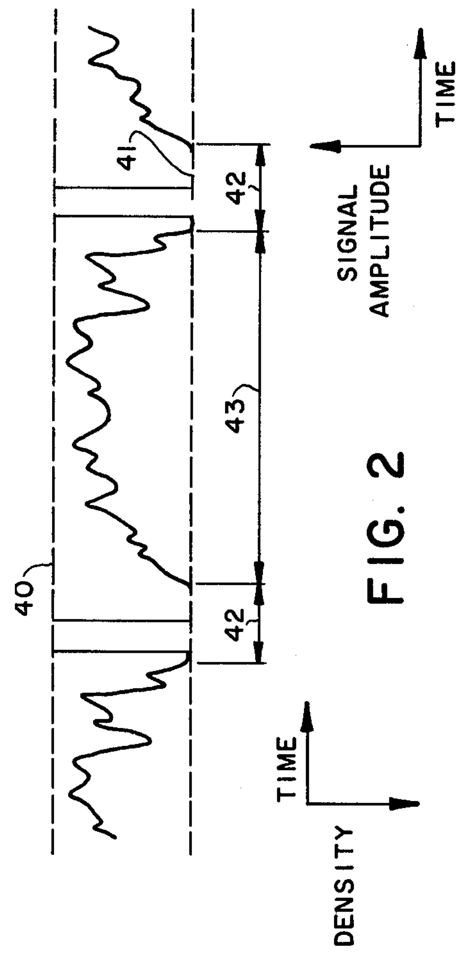
FIG. 2 shows a typical signal waveform at point X or point Y in the apparatus of FIG. 1.

The signal levels at points X and Y are shown in FIG. 2, wherein the signal varies between a voltage 40 representing peak white or zero density and black level or maximum density 41. Peak white and black normally occur only as reference levels supplied during the line blanking interval 42, when picture information is suppressed. Picture information is available during the active line period 43.

This information is fed to the control signal channel to a gray clamp circuit 21, to be more fully described later. At the commencement of a line scan period the output of the gray clamp circuit 21 is stabilized at a preset gray reference level and the picture information supplied during the active line period 43 produces modulation of the gray clamp output about this preset level. The gray clamp output is applied to a voltage controlled oscillator 22 which may, for example, be a blocking oscillator or a multivibrator.

In a blocking oscillator, as more fully described later, the frequency is inversely proportional to the period required to recharge a base circuit capacitor, and in a multivibrator the frequency is inversely proportional to the sum of the capacitor charging periods. These periods are dependent on the charging current, which is arranged by methods well known in the art, to be proportional to the control voltage. It is not necessary for the control voltage to be maintained constant for a period which is long compared with the oscillator period, since each individual period is determined by the time required to accumulate certain charges on the capacitor or capacitors in the case of the blocking oscillator or the multivibrator respectively, and this is inversely proportional to the integral of the control voltage over this time.

In the present application the component values for the voltage controlled oscillator 22 are chosen to give a nominal maximum frequency of 5120 Hz, so that with the approximately 20 Hz field frequency used the count per field will be a maximum of 256.

The output of the voltage controlled oscillator 22 is taken through a single field gate 23, which allows the sequence of pulses from an individual scanning field to pass to the counter 24. Single integrated circuit four or eight-stage binary counters are commercially available to meet such counter requirements. The information stored in the counter 24 is then used by a logic unit 25 to control the switched attenuator 26 and hence to give brightness modulation of the cathode ray tube 27.

A push-button control unit 31, provides a facility in conjunction with the logic unit 25 to modify the count fed from the counter 24 to the attenuator 26 if required.

Figure 3:
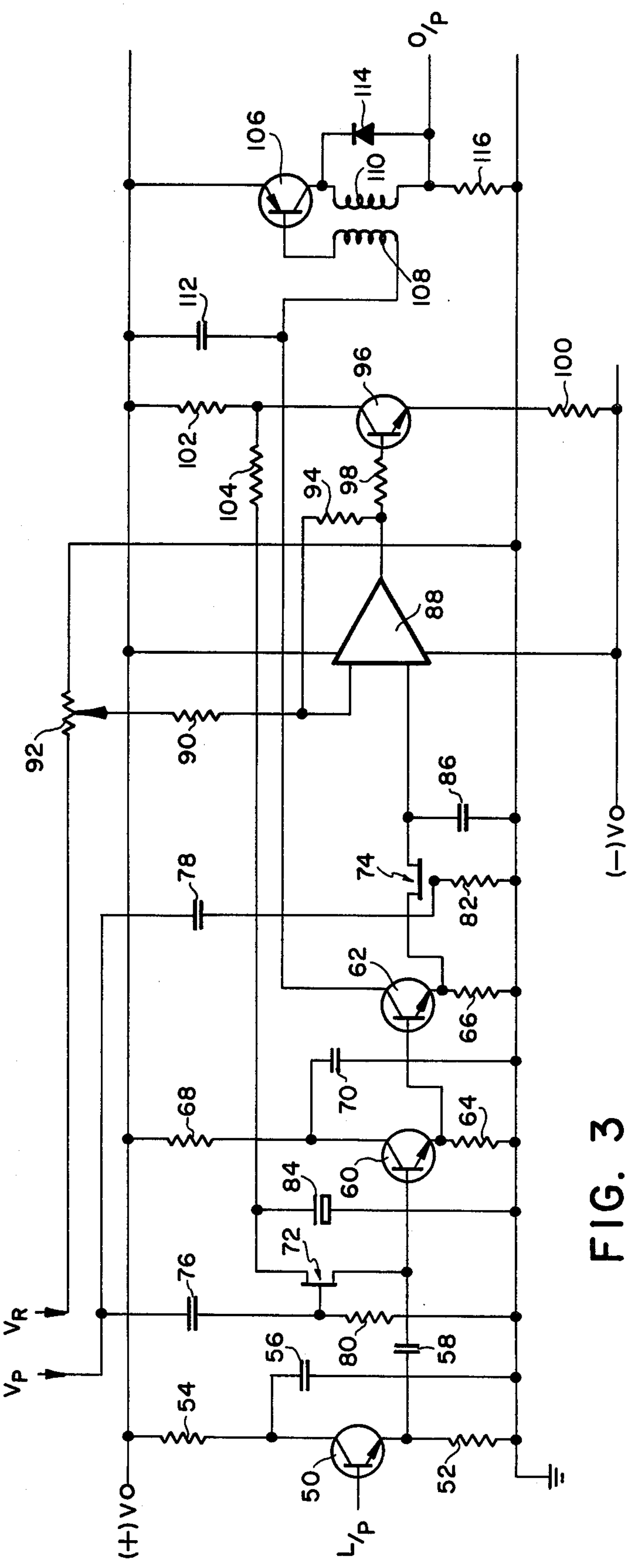
FIG. 3 is a circuit diagram of a gray clamp circuit and a voltage controlled oscillator for use in the apparatus of FIG. 1.

The gray clamp circuit 21 and voltage controlled oscillator 22 are shown in detail in FIG. 3 and have voltage supply terminals +V and −V. The input signal is fed to a common-collector buffer amplifier transistor 50, having an emitter load resistor 52, a collector bias resistor 54 and a decoupling capacitor 56.

The amplified signal is coupled by way of capacitor 58 to transistors 60 and 62 which are connected to a Darlington configuration. Transistors 60 and 62 have emitter resistors 64 and 66 respectively, and transistor 60 has a collector bias resistor 68 with a decoupling capacitor 70. The collector of transistor 62 is connected to the voltage controlled oscillator. The gates of field-effect transistors 72 and 74 receive a clamp pulse Vp through capacitors 76 and 78 respectively during each line blanking interval to bias them into conduction. Resistors 80 and 82 provide discharge paths for capacitors 76 and 78 respectively.

During each line blanking interval the pulsing of field-effect transistor 72 connects capacitors 58 and 84. Capacitor 84 having a capacity several orders larger than capacitor 58 (typically 125 microfarad and 0.068 microfarad respectively), the potential on capacitor 58 is made equal to the potential on capacitor 84.

As later described, the potential on capacitor 84 is controlled from a reference potential $V_R$. Thus at the commencement of each time scan the base-emitter potential of transistor 60 is established at a reference gray level. Modulation of this level by the corrected video signal, gives an output signal at the collector of transistor 62 having an instantaneous value of the deviation of the video signal from the preset gray level, which is fed to the voltage controlled oscillator.

A 180° out-of-phase signal corresponding to this output signal is developed across emitter resistor 66. This voltage is sampled during the line blanking interval, that is when the reference gray level is applied to the base of transistor 60, by pulsing of field-effect transistor 74 which places a corresponding potential on capacitor 86. The potential on capacitor 86 is applied to one input of and integrated circuit differential amplifier 88. The second input thereof is fed through resistor 90 from a potentiometer 92 across the reference potential $V_R$, the potentiometer establishing a preset gray voltage level. Resistor 94 provides feedback stabilization for the differential amplifier 88. An inverting buffer amplifier transistor 96 is fed by base resistor 98 and has collector and emitter resistors 100 and 102 respectively. The error signal, that is the difference between the reset gray voltage level and the potential across capacitor 86 and hence on capacitor 84 is thus inverted and then fed back to capacitor 84 to correct the potential thereon, through current limiting resistor 104.

The voltage controlled oscillator is a conventional common-emitter blocking oscillator, comprising a transistor 106 having transformer coupling between base and collector windings 108 and 110 respectively, and a base circuit capacitor 112. Diode 114 is connected across winding 110 to suppress the second and subsequent half-cycles of oscillation and to prevent the back voltage present when the induced field collapses exceeding the $BV_{CBO}$ rating of the transistor 106. A load resistor 116 is connected in series with winding 110 and an output is taken from the junction of resistor 116 and winding 110. During manual operation, transistor 106 will be normally cut-off due to the reverse base voltage stored on 112. Application of the current from the collector of transistor 62 discharges capacitor 112 until the transistor 106 becomes biased to conduction. Regenerative coupling through the transformer from winding 110 to winding 108 causes the transistor 106 to conduct heavily and recharges capacitor 112. This action is terminated by saturation of the transformer and regenerative action turns off transistor 106 rapidly leaving capacitor 112 charged. The time required for discharge of capacitor 112 by the current from 62 determines the cycle time of the blocking oscillator. The output frequency from transistor 106 is inverseproportional to the applied current and hence to the deviation from the preset gray voltage level.

The counter, as shown and described, is an eight-stage binary counter but any desired number of stages and any convenient radix may be used, or alternatively a ring counter can be employed.

The voltage controlled oscillator operating range may be changed to accommodate a different field scan rate or to provide coarser or finer attenuation steps. A simple relationship between field scan rate, oscillator frequency and counter capacity thus exists.

The push-button control unit for providing manual adjustment can also be achieved by adjustment of clamp reference potentials or by adding further attenuation in cascade with the switched attenuator.

Discrimination of the scanned area on a spatial basis is possible by appropriate choice of the duration and phase of the gating waveform.

By use of resistive matrices correction can be made for colors known to be critical, other than the primary hues.

The principles described can equally well be applied to negative film printing, or transparency or motion picture duplication or to televising of film by a color television machine.

The description has been in relation to a control of density at the output, but if desired control of transmission may e obtained by taking an initial input from a point in the chain where a signal exists having an amplitude related to transmission.

The invention has been described in detail with particular reference to preferred embodiments thereof, but it will be understood that variations and modifications can be effected within the spirit and scope of the invention.

What is claimed is:

1. The method of determining the density of an image bearing medium comprising:
scanning an image bearing medium in a raster pattern to produce a first electrical signal whose varying level is representative of the density of successive incremental areas of said image bearing medium;
clamping said first electrical signal to a predetermined signal level to produce a second electrical signal having a level varying about said predetermined signal level;
converting said level varying second electrical signal into a frequency varying third electrical signal having a frequency dependent on the variation of said second signal level from said predetermined level; and
summing the number of cycles of said third signal over a complete raster scan of said image bearing medium to obtain a fourth electrical signal which is representative of the average density of said image bearing medium.

2. The method of claim 1 including the step of utilizing said fourth electrical signal to control the exposure in the making of a reproduction on photosensitive material from said image bearing medium.

3. An image reproduction apparatus including:
scanning means for scanning an original in a raster pattern to produce a first electrical signal whose varying level is representative of the density of successive incremental areas of said image bearing medium;
clamping means for clamping a portion of said first electrical signal to a predetermined signal level to produce a second electrical signal having a signal level varying about said predetermined signal level;
converting means for converting said level varying second electrical signal into a frequency varying third electrical signal having a frequency dependent on the variation of said second signal level from said predetermined level;
summing means for summing the number of cycles of said third signal over a complete raster scan of said image bearing medium to obtain a fourth electrical signal which is representative of the average density of said image bearing medium;
modifying means connected to said scanning means for modifying said first electrical signal;
control means connected to said summing means for controlling said modifying means to effect modification of said first electrical signal as a function of said fourth electrical signal to produce a fifth electrical signal; and
electrooptical means controlled by said fifth signal for producing a reproduction of said image bearing medium on photosensitive material.

4. The apparatus of claim 3 wherein said electrooptical means includes a flying spot scanning cathode ray tube.

5. The apparatus of claim 3 wherein said control means includes manually operable means for manually controlling said control means.

6. The apparatus of claim 3 wherein said means for scanning an image bearing medium in a raster pattern includes means for producing a beam of radiant energy and for causing the beam of radiant energy to scan said image bearing medium point-to-point in a raster pattern to produce a modulated beam of energy modulated by the point-to-point density of said image bearing medium; and
further includes optoelectrical means for sensing said modulated beam of energy and for producing said first electrical signal.

7. The apparatus of claim 6 wherein said image bearing medium is a transparency and said beam of radiant energy is modulated by the transmission of said radiant energy through said transparency.

8. The apparatus of claim 6 wherein said producing means produces a beam of radiant energy in the visible spectrum.

9. The apparatus of claim 6 wherein said producing means includes a flying spot scanning cathode ray tube.

10. The apparatus of claim 6 wherein said optoelectrical means includes a logarithmic amplifier.

11. The apparatus of claim 10 wherein said optoelectrical means includes a resistive matrix.

12. The apparatus of claim 3 wherein said predetermined signal level is representative of the color gray and wherein said converting means includes a voltage controlled oscillator which converts a voltage varying second electrical signal into a frequency varying third electrical signal.

13. The apparatus of claim 12 wherein said summing means includes a counter.

14. The apparatus of claim 13 wherein said modifying means includes an attenuator and wherein said control means includes logic means for controlling the attenuation of said first electrical signal by said attenuator as a function of the count of said counter.

* * * * *